VAN PATTEN & CLAPP.
Carriage Top Joint.

No. 109,782.           Patented Nov. 29, 1870.

Witnesses.
A. Bennerxendorf
L. S. Mabee

Inventor.
F. Van Patten
E. D. Clapp
per Mnnn & Co
Attorneys.

United States Patent Office.

FREDERICK VAN PATTEN AND EMEROUS D. CLAPP, OF AUBURN, NEW YORK, ASSIGNORS TO THEMSELVES AND M. S. FITCH, OF SAME PLACE.

Letters Patent No. 109,782, dated November 29, 1870.

IMPROVEMENT IN STUMP-JOINTS FOR CARRIAGE-TOP BRACES.

The Schedule referred to in these Letters Patent and making part of the same.

*To all whom it may concern:*

Be it known that we, FREDERICK VAN PATTEN and EMEROUS D. CLAPP, of Auburn, in the county of Cayuga and State of New York, have invented a new and useful Improvement in Stump-Joints for Carriage-top Braces; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Our invention has for its object to furnish improved joints for carriage-top braces, known among carriage builders as "stump-joints," which shall be so constructed as to facilitate the labor of welding them to the round or oval iron that forms the arms of the braces, the joints being so forged and finished that they can be easily welded by the smith without injury to the joint or to the milled and finished parts.

Figure 1:
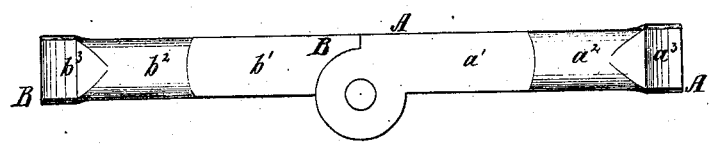
Figure 1 is a side view of our improved stump-joint ready for market.
Figure 2:
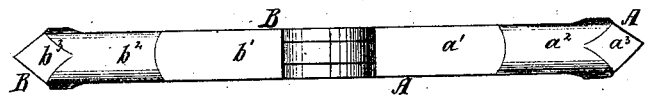
Figure 2 is an edge view of the same.
Figure 3:
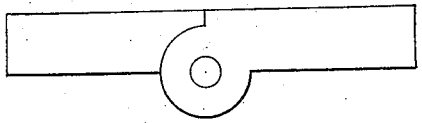
Figure 3 represents a stump-joint as heretofore sent to market.

As hitherto made and sold, stump-joints have been made with square edges for the entire length of the arms of the joints, as shown in fig. 3. To weld the joints thus made to the oval or round iron, to form the arms of the braces, it is necessary for the smith to heat the two ends of the stump-joints, secure them in a clamp or vise, and upset them, to obtain metal enough to make up for the necessary waste in taking a welding-heat. After being upset, the joints have to be heated to a welding-heat. These successive heats to a short piece of iron, and so close to the joint, must necessarily cause the iron to scale and damage the milling and joint. The joints, also, cannot be clamped and held for upsetting without bruising and marring the finished flat parts required to be left upon each joint. The result is that the joints are so damaged that they will soon wear and become loose.

In forming our improved stump-joint, a bar of iron, of the proper size and length, for one part, A, of the joint, is heated to the proper heat, placed in dies of proper form to form the square part $a^1$, the round or oval part $a^2$, and the enlarged or swaged part or end $a^3$.

The part A, when trimmed and milled, and fitted to the other part, B, which is formed in exactly the same way, is ready for market.

By this construction enough metal for welding is left or gathered at the ends of the joint, and the parts $a^2 b^2$ of the joint, adjacent to said ends, will be made round or oval, to correspond with the form of the arms to be welded to said joints, to form the completed braces.

The stump-joints thus forged are ready for the welding-heat without any further preparation.

Having thus described our invention,

We claim as new and desire to secure by Letters Patent—

Improved stump-joints for carriage-top braces, constructed and formed or forged with dies, substantially as herein shown and described, as a new article of manufacture.

FREDERICK VAN PATTEN.
EMEROUS D. CLAPP.

Witnesses:
HORACE T. COOK,
FRANK B. MARTIN.